(12) United States Patent
Zilbershtein et al.

(10) Patent No.: US 8,571,061 B2
(45) Date of Patent: Oct. 29, 2013

(54) INTER-NETWORK TRANSLATION

(75) Inventors: Itai Ephraim Zilbershtein, Hod-Hasharon (IL); Shlomo Biton, Rehovot (IL); Dan Gluskin, Tel-Aviv (IL)

(73) Assignee: Avaya Communications Israel Ltd., Tel Aviv (IL)

( * ) Notice: Subject to any disclaimer, the term of this patent is extended or adjusted under 35 U.S.C. 154(b) by 2233 days.

(21) Appl. No.: 11/482,608

(22) Filed: Jul. 7, 2006

(65) Prior Publication Data

US 2008/0008211 A1 Jan. 10, 2008

(51) Int. Cl.
*H04L 5/00* (2006.01)

(52) U.S. Cl.
USPC .......................................... 370/466; 370/261

(58) Field of Classification Search
USPC .................. 370/352, 466; 709/232, 233; 717/168–173
See application file for complete search history.

(56) References Cited

U.S. PATENT DOCUMENTS

| | | | |
|---|---|---|---|
| 5,727,159 A | 3/1998 | Kikinis | |
| 5,787,472 A | 7/1998 | Dan et al. | |
| 5,822,759 A | 10/1998 | Treynor | |
| 6,118,472 A | 9/2000 | Dureau et al. | |
| 6,226,676 B1 | 5/2001 | Crump et al. | |
| 6,601,143 B1 | 7/2003 | Lamparter | |
| 6,618,359 B1 | 9/2003 | Chen et al. | |
| 6,654,766 B1 | 11/2003 | Degenaro et al. | |
| 6,687,793 B1 | 2/2004 | Thomas et al. | |
| 6,742,019 B1 | 5/2004 | Dan et al. | |
| 6,742,043 B1 | 5/2004 | Moussa et al. | |
| 6,748,487 B1 | 6/2004 | Takamoto et al. | |
| 6,754,699 B2 | 6/2004 | Swildens et al. | |
| 6,807,607 B1 | 10/2004 | Lamparter | |
| 6,834,329 B2 | 12/2004 | Sasaki et al. | |
| 6,848,037 B2 | 1/2005 | Flaherty et al. | |
| 6,871,268 B2 | 3/2005 | Iyengar et al. | |
| 6,895,425 B1 | 5/2005 | Kadyk et al. | |
| 7,324,504 B2 * | 1/2008 | Park .............................. | 370/352 |
| 2005/0144616 A1 | 6/2005 | Hammond et al. | |
| 2005/0174994 A1 | 8/2005 | Park | |
| 2005/0216906 A1 | 9/2005 | Shahindoust et al. | |

OTHER PUBLICATIONS

Cisco ACNS Caching and Streaming Configuration Guide, Release 5.1, 2003, Cisco Systems, pp. 61-65, 311-315.*
RFC 1350, RFC 2616 and RFC 768.*
"A Generalized Interval Caching Policy for Mixed Interactive", A. Dan, D. Sitaran (1996) http://citeseer.ist.psu.edu/cachedpage/164940/1.
"Resource based Caching for Web Servers" http://www.cs.utexas.edu/users/vin/pub/pdf/mmcn98rbc.pdf.
"Proxy Caching for Media Streaming Over the Internet"—a survey, J. Liu, J. Xu, http://www.cs.sfu.ca/~jcliu/papers/comm04.pdf.
RFC2001, RFC2581, RFC3390. http://www.ietf.org/rfc/.

* cited by examiner

*Primary Examiner* — Andrew Goldberg

(57) ABSTRACT

A method for bidirectional gating between low parallelity devices in a network and a remote server with a higher parallelity capability. The method comprises: (a) intercepting a plurality of requests for a same content item stored on a remote server from a plurality of devices, said requests in a low parallelity protocol; (b) storing said requests as stored requests; (c) translating one of said requests to a high parallelity protocol to produce a translated request and relaying said translated request to said remote server; (d) additionally intercepting a response to said translated request from said remote server in, said response in said higher parallelity protocol; (e) additionally translating said response to said low parallelity protocol to produce a translated response and storing said translated response; and (f) filling each of said stored requests with said translated response.

11 Claims, 5 Drawing Sheets

INTER-NETWORK TRANSLATION

REFERENCE TO RELATED APPLICATION

This application is related to a co-pending application entitled "cache memory storage' by the same inventors as the current application and identified as Ser. No. 11/482,217 the specification of which is fully incorporated herein by reference.

FIELD OF THE INVENTION

The present invention relates to translation of data between protocols with different degrees of parallelity to improve communication between one or more network devices and a remote server.

BACKGROUND OF THE INVENTION

Wide area networks (WAN), such as the Internet, are an important channel of content distribution today. WAN servers typically communicate using a standard WAN communication protocol, such as FTP or HTTP. Typically, WAN protocols use the TCP transport layer protocol, which uses a sliding window feature to manage acknowledgements. Using the sliding window in transmission of a file, a plurality of data blocks of the file may be transmitted before receipt of an acknowledgement for a previous block of the file. WAN protocols such as HTTP are characterized by a high degree of parallelity. In addition, some WAN protocols (e.g. HTTPS) have a capacity for secure data transmission.

Local area networks (LAN) were originally conceived to facilitate information transfer and/or sharing of resources (e.g. printers or media readers) among a group of computers in a defined location. Typically the location definition was an institution or business. LAN protocols such as TFTP are characterized by a low degree of parallelity and/or lack a capacity for secure data transmission.

With the advent of WAN technology, many LANs are connected to a WAN (e.g. the Internet). Some LAN devices, such as desktop and laptop computers, operate WAN compatible software which can formulate requests and receive responses in a standard WAN communication protocol. For example, Web browsers can formulate HTTP requests and send them to a WAN server and receive an HTTP response in the form of a WWW page.

However, many LAN devices (e.g. IP phones and wireless access points) are not designed and/or configured to employ standard high parallelity and/or secure communication protocols. Other LAN devices support the HTTP protocol for some purposes, but rely upon low parallelity and/or insecure protocols such as trivial file transfer protocol (TFTP) for other purposes such as firmware upgrade. As a result, even though these devices reside in a LAN with a connection to a WAN, these LAN devices derive little benefit from content residing on a remote WAN server because attempts to retrieve a content item from a remote server using TFTP are subject to long response time. A long response time may result in the request being timed out before a download is completed. Alternatively or additionally, a lost packet may result in timeout in a TFTP client before requesting the same block again. Another problem is large latency which cause to lower transfer rates because TFTP clients waits until a response packet is received before sending a request for the next block. These problems become more severe as the size of a requested content item increases.

WAN protocols also offer other features not typically inherent in LAN protocols such as congestion avoidance, slow start, fast retransmit, fast recovery. These features are described, for example in RFC2001, RFC2581, RFC3390 (These requests for comments are fully incorporated herein by reference and are publicly available from <http://www.ietf.org/rfc/>). In general, these features are supported by HTTP in TCP/IP, but not by UDP/IP.

LAN devices (e.g. IP phones and wireless access points) frequently employ the TFTP protocol for file distribution. However, TFTP was designed for use primarily in a LAN environment with low latency/per block confirmation. For example, in TFTP, files are transferred consecutively block by block; each block being transmitted only after acknowledgement of the immediately previous transmitted block was received [low parallelity]. The inherently high latency of WAN links means that, transmission of files across a WAN using TFTP may be very slow. Furthermore, TFTP lacks security measures. In addition, operation of many similar devices making similar requests in a short period of time can cause network congestion as multiple copies of the same file are transmitted over low bandwidth connections.

US patent publication 2005/0174994 by Park, the disclosure of which is incorporated herein by reference, discloses a system for automatically upgrading firmware of Internet videophones. Park teaches interposing an upgrade server between a plurality of network devices and a remote TFTP or HTTP server. According to the teachings of Park, each network device communicates individually with the remote TFTP or HTTP server. Park does not address the problem that devices which employ the TFTP protocol are subject to the inherently slow speed of that protocol.

U.S. Pat. No. 6,226,676 to Crump et al. and U.S. Pat. No. 6,618,359 to Chen et al., the disclosures of which are each fully incorporated herein by reference, describe a proxy which translates between a first communication protocol and a second communication protocol to allow machines configured with incompatible protocol suites to communicate with each other. Crump and/or Chen teach maintaining an end to end connection between the two machines.

US patent publication 2005/0216906 by Shahindoust et al., the disclosure of which is incorporated herein by reference, teaches active distribution of software updates to subscribers.

US patent publication 2005/0144616 by Hammond et al., the disclosure of which is incorporated herein by reference, teaches active download of an update file in its entirety from an update server, validation of the file and then active transmission of the file to one or more systems which are to be updated. The proxy of the Hammond application also actively identifies systems which are in need of an update.

U.S. Pat. Nos. 6,742,043; 5,727,159; 6,118,472 and 6,895,425 relate generally to the concept of proxy servers and are cited here as being generally indicative of the state of the art. The disclosure of each of these patents is fully incorporated herein by reference.

SUMMARY OF THE INVENTION

An aspect of some embodiments of the present invention relates to installing software updates on network devices. In an exemplary embodiment of the invention, the network devices include IP phones and/or wireless access points.

An aspect of some embodiments of the present invention relates to facilitating download of a content item from a server using a relatively high parallelity communication protocol to a network device that employs a lower parallelity protocol. Optionally, the content item is a software update. In an exemplary embodiment of the invention, the server operates according to a TCP/IP protocol and the network device operates according to a UDP/IP protocol.

Previously available alternatives required either that a network device request a content item from a remote server across a WAN link in a low parallelity protocol or that the relevant content item be pre-installed on a local server for easy retrieval by network devices in a low parallelity protocol. In an exemplary embodiment of the invention, a request from a network device is not sent across a WAN link in a low parallelity protocol. In an exemplary embodiment of the invention, the necessity for pre-installation of content items on a local server is obviated.

Optionally, a plurality of similar devices make requests for a same content item. Optionally, the requests are temporally coordinated. In an exemplary embodiment of the invention, only one of the requests is relayed to the remote server. In an exemplary embodiment of the invention, a single response from the server is used to fill requests from multiple devices.

In an exemplary embodiment of the invention, the server is capable of communication in the low parallelity protocol. In an exemplary embodiment of the invention, a facilitating gateway is installed between LAN devices employing a low parallelity protocol and a WAN server capable of communication in a higher parallelity protocol The high parallelity protocol optionally employs a sliding window algorithm. Optionally, the low parallelity protocol employs a "Request and wait" algorithm. "Parallelity" as used herein, refers to a number of data transfer units (e.g., packets) concurrently sent by a responding device in response to a single acknowledgment. As the parallelity of a protocol increases, the number of requests and responses that can be pipelined on a single TCP connection also increases. Pipelining allows transmission of additional data packets without waiting for a response to a previous data packet. Pipelining allows a single TCP connection to be used more efficiently, with reduced elapsed time for completion of a task.

Parallelity is relative and the invention relates to transfer of content between protocols with different degrees of parallelity. For this reason, relative pairs of terms such as "low" and "higher" or "high" and "lower" are used in conjunction with parallelity. TFTP/UDP/IP is an example of a low parallelity protocol. HTTP/TCP/IP; FTP/TCP/IP, SFTP/TCP/IP and HTTPS/TCP/IP are examples of high parallelity protocols. Optionally, TCP is more reliable than UDP because TCP manages data streams while UDP manages only packet exchange.

The gateway optionally implements caching to facilitate gating. Optionally, the gating is bidirectional. In an exemplary embodiment of the invention, the gateway translates data transfer units from one size to another size to facilitate the gating, Optionally, a caching mechanism receives content in packets and divides each packet into smaller blocks for storage and/or transfer in the LAN. Optionally the caching employs an interval caching algorithm. In some embodiments of the invention, dynamic flow control is applied to the interval caching algorithm. Optionally, relay to the LAN device(s) includes streaming of data from the cache. In some embodiments of the invention, the WAN employs a secure protocol (e.g. HTTP or SCP) and/or the LAN employs a protocol which is not secure (e.g. TFTP). According to some embodiments of the invention, the gateway handles transforms non-secure requests to secure requests. Optionally, this involves configuration of credentials on the gateway.

Optionally, the software download is temporally coordinated so that a plurality of devices makes similar requests within a short period of time. Temporal coordination may be achieved, for example, by using a proxy or other controller to initiate performance of a task. Optionally, the task is a software installation or upgrade. Optionally, the devices are phones (e.g. IP phones) or wireless access points. In an exemplary embodiment of the invention, the gateway identifies matching requests originating from multiple devices and relays only one request from a group of matching requests to a remote server.

In an exemplary embodiment of the invention, concurrent software updates for a plurality of LAN devices is performed using a network cache to temporarily store a content resource retrieved from a WAN server.

An aspect of some embodiments of the present invention relates to performing a coordinated software update of network devices using a content resource retrieved from a remote server in a secure fashion. In an exemplary embodiment of the invention, the network devices are configured to employ a non-secure communication protocol to make requests from the remote server. TFTP is an example of a non-secure protocol. HTTPS is an example of a secure protocol. In an exemplary embodiment of the invention, a translator gateway translates a request originating in a LAN in a non secure protocol to a secure protocol prior to relay to a remote server. In an exemplary embodiment of the invention, a response received from a remote server in a secure protocol is translated to a non secure protocol prior to transmission and/or distribution within a LAN.

In an exemplary embodiment of the invention, there is provided a method for bidirectional gating between low parallelity devices in a network and a remote server with a higher parallelity capability, the method comprising:

(a) intercepting a plurality of requests for a same content item stored on a remote server from a plurality of devices, said requests in a low parallelity protocol;

(b) storing said requests as stored requests;

(c) translating one of said requests to a high parallelity protocol to produce a translated request and relaying said translated request to said remote server;

(d) additionally intercepting a response to said translated request from said remote server, said response in said higher parallelity protocol;

(e) additionally translating said response to said low parallelity protocol to produce a translated response and storing said translated response; and (f) filling each of said stored requests with said translated response.

Optionally, said translating includes dividing at least one packet of said response into at least two blocks.

Optionally, said translating includes translation from a TFTP/UDP/IP protocol to an SCP/TCP/IP protocol and wherein said additionally translating includes translation from a SCP/TCP/IP to a TFTP/UDP/IP protocol.

Optionally, said translating includes translation from a TFTP/UDP/IP protocol to an HTTPS/TCP/IP protocol and wherein said additionally translating includes translation from a HTTPS/TCP/IP protocol to a TFTP/UDP/IP protocol.

Optionally, said translating includes translation from a TFTP/UDP/IP protocol to an FTP/TCP/IP protocol and wherein said additionally translating includes translation from a FTP/TCP/IP protocol to a TFTP/UDP/IP protocol.

Optionally, said translating includes translation from a TFTP/UDP/IP protocol to an HTTP/TCP/IP protocol and wherein said additionally translating includes translation from a HTTP/TCP/IP protocol to a TFTP/UDP/IP protocol.

Optionally, said translating includes translation from a TFTP/UDP/IP protocol to an SFTP/TCP/IP protocol and wherein said additionally translating includes translation from a SFTP/TCP/IP protocol to a TFTP/UDP/IP protocol.

Optionally, said storing includes caching at least a portion of said response.

Optionally, said filling begins before said additionally translating has been completed.

Optionally, said low parallelity protocol supports concurrent transmission of only one data transfer unit.

Optionally, said higher parallelity protocol supports concurrent transmission of as many as forty-four data transfer units.

In an exemplary embodiment of the invention, there is provided a method of processing a request from a network device, the method comprising:
(a) intercepting a request for download of an external content item from a network device, said request in a low parallelity protocol;
(b) translating said request to a higher parallelity protocol to produce a translated request; and
(c) relaying said translated request to at least one server with a higher parallelity capability.

Optionally, said server is capable of processing said request for download of an external content item in a low parallelity protocol.

Optionally, the method comprises: (d) storing said request.

Optionally, said request includes an address of said server.

Optionally, said translating includes addition of an address of a WAN server.

Optionally, said translating includes translation from a TFTP/UDP/IP protocol to an SCP/TCP/IP protocol.

Optionally, said translating includes translation from a TFTP/UDP/IP protocol to an HTTPS/TCP/IP protocol.

Optionally, said translating includes translation from a TFTP/UDP/IP protocol to an HTTP/TCP/IP protocol.

Optionally, said translating includes translation from a TFTP/UDP/IP protocol to an FTP/TCP/IP protocol.

Optionally, said translating includes translation from a TFTP/UDP/IP protocol to an SFTP/TCP/IP protocol.

Optionally, said request originates from a telephone.

Optionally, said request originates from a wireless access point.

Optionally, said low parallelity protocol is TFTP.

Optionally, said low parallelity protocol supports concurrent transmission of only one data transfer unit.

Optionally, said higher parallelity protocol supports concurrent transmission of as many as forty-four data transfer units.

In an exemplary embodiment of the invention, there is provided a method of gating between a server with a high parallelity capability and a lower parallelity network, the method comprising:
(a) intercepting a response from a remote server, said response in a high parallelity protocol;
(b) translating said response to a lower parallelity protocol to create a translated response; and
(c) relaying said translated response to at least one device residing in a low parallelity network.

Optionally, said relaying begins before said translating has been completed.

Optionally, said translating includes translation from an SCP/TCP/IP protocol to an TFTP/UDP/IP protocol.

Optionally, said translating includes translation from an HTTPS/TCP/IP protocol to an TFTP/UDP/IP protocol.

Optionally, said translating includes translation from an FTP/TCP/IP protocol to an TFTP/UDP/IP protocol.

Optionally, said translating includes translation from an HTTP/TCP/IP protocol to an TFTP/UDP/IP protocol.

Optionally, said translating includes translation from an SFTP/TCP/IP protocol to an TFTP/UDP/IP protocol.

Optionally, the method additionally comprises:
(d) comparing said response to at least one stored request.

Optionally, said translating includes dividing at least one packet of said response into at least two blocks.

Optionally, said comparing indicates that at least two of said at least one device should be targets of said relaying.

Optionally, said at least one device includes a telephone.

Optionally, said at least one device includes a wireless access point.

Optionally, said translating includes caching at least a portion of said response.

Optionally, said lower parallelity protocol supports concurrent transmission of only one data transfer unit.

Optionally, said high parallelity protocol supports concurrent transmission of as many as forty-four data transfer units.

In an exemplary embodiment of the invention, there is provided a method for bidirectional gating between low parallelity telephones in a network and a remote server with a higher parallelity capability, the method comprising:
(a) intercepting a plurality of requests for a same content item stored on a remote server from a plurality of telephones, said requests in a low parallelity protocol;
(b) storing said requests as stored requests;
(c) translating one of said requests to a high parallelity protocol to produce a translated request and relaying said translated request to said remote server;
(d) additionally intercepting a response to said translated request from said remote server, said response in said higher parallelity protocol;
(e) additionally translating said response to said low parallelity protocol to produce a translated response and storing said translated response; and
(f) filling each of said stored requests with said translated response.

BRIEF DESCRIPTION OF DRAWINGS

In the FIGS., identical structures, elements or parts that appear in more than one FIG. are generally labeled with the same or similar numeral in all the FIGS. in which they appear. Dimensions of components and features shown in the FIGS. are chosen for convenience and clarity of presentation and are not necessarily shown to scale. The FIGS. are listed below.

DETAILED DESCRIPTION OF EMBODIMENTS

General System Architecture

In order to make the significant advantages of the present invention more clear, a brief explanation of prior art LAN networks and their interaction with a prior art remote server located across a WAN, such as the Internet is presented.

Figure 1:
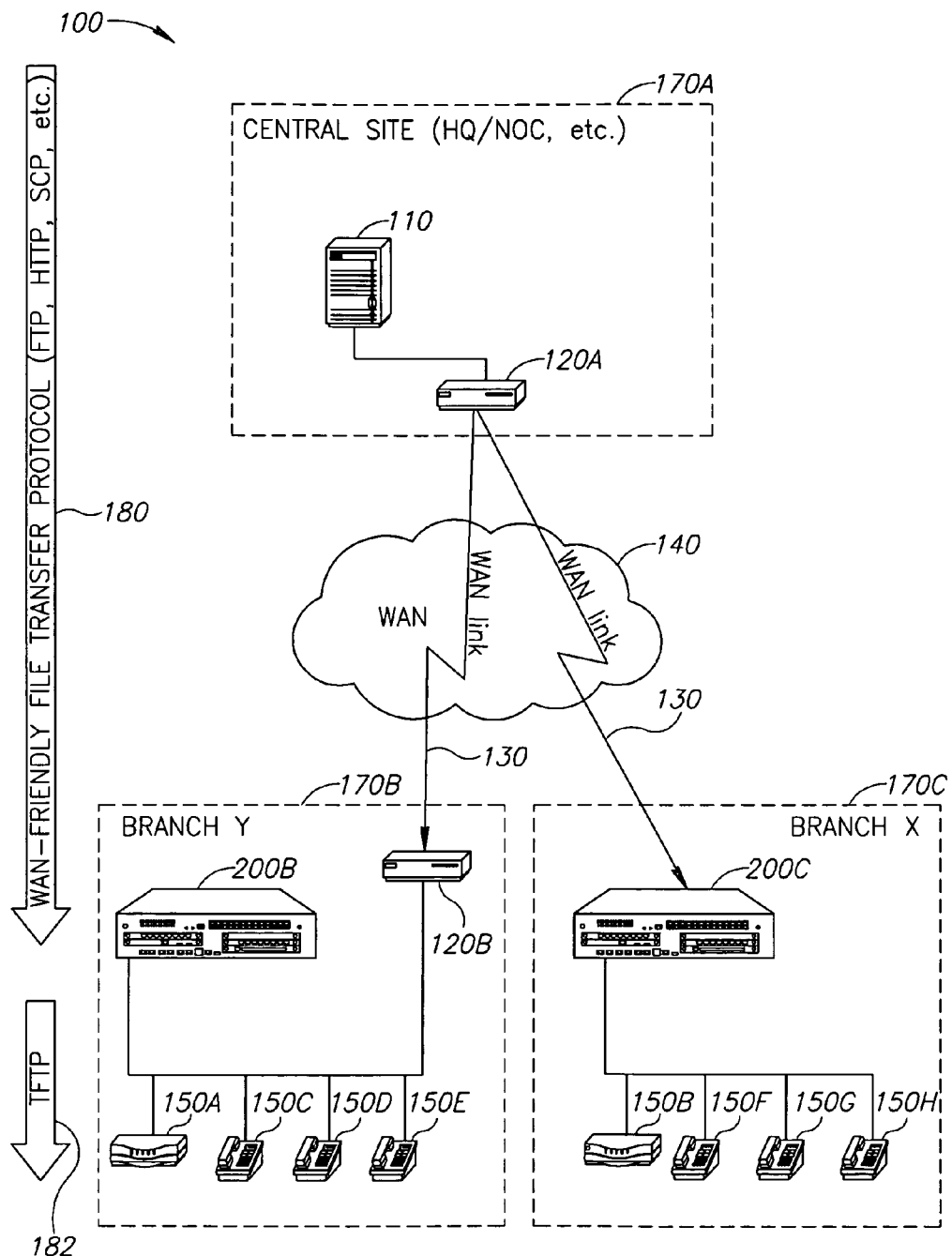
FIG. 1 illustrates alternate installation configurations for a computerized gating device facilitating content transfer between prior art LAN devices and a prior art WAN server according to some exemplary embodiments of the present invention.

FIG. 1 illustrates communication between WAN server 110 and client LANs 170B and 170C. Server 110 typically employs a WAN transfer application layer protocol such as, for example, HTTP, HTTPS, SCP, SFTP or FTP (indicated by arrow 180). Previously available alternatives generally presumed that devices residing in LANs 170B and/or 170C would communicate with server 110 according in order to access content in either a high parallelity protocol such as HTTP, HTTPS, FTP, SFTP or SCP or in a low parallelity protocol such as TFTP. As a result, devices in LANS 170B and/or 170C which communicated in low parallelity protocols such as TFTP derived little benefit from remote content such as that stored on WAN server 110.

This is because high parallelity protocols operate with reasonable efficiency across a WAN link and transfer of a requested content resource is generally successful. Most personal computers in use today employ a high parallelity protocol such as HTTP to retrieve content from remote servers.

In contrast, low parallelity protocols are inefficient over WAN links and are prone to timeouts and/or repeat requests. As a result, use of low parallelity protocols over a WAN link is undesirable both from the standpoint of a requesting device 150 and from the standpoint of bandwidth utilization in a WAN link 130.

Some endpoint devices 150 (e.g. wireless access points 150A and 150B and/or IP phones 150C; 150D; 150E; 150F; 150G and 150H) are configured with limited communication capabilities and are capable of communicating only in low parallelity protocols (e.g. TFTP; indicated by arrow 182). The term telephone as used in this specification and the accompanying claims includes IP telephones as well as telephones which operate through the public switched telephone network as well as wireless phones and/or wireless access points. These devices with limited communication capabilities typically derived little benefit from content items stored outside their own LAN. In cases where devices with limited communication capabilities attempted to retrieve content items stored outside their own LAN their requests are subject to timing out and/or to long download times. Repeated unsuccessful attempts to complete a download of a content item from remote server 110 made unnecessary demands on WAN links 130.

In order to circumvent the problem of repeated unsuccessful attempts to complete a download of a content item from remote server 110 and/or unnecessary demands on WAN links 130 it was common to install a TFTP server (not shown) within each LAN for distribution of content to limited capability devices 150. The TFTP server required advance installation of appropriate content items for the limited capability devices 150. The advance installation typically required human intervention and is commonly referred to as manual provisioning. Manual provisioning of a TFTP server in each branch of a company requires a significant input in man-hours. Logistically, management of upgrades at a large number of branches where each branch has its own local TFTP server is complicated.

Manual provisioning was used, for example, in cases where a local TFTP server was installed in each branch (e.g. branch X[170C] and branch Y [170B]) to solve the problems of using WAN connection for upgrade from central office 170 by large numbers (e.g. thousands) of IP phones 150. In some cases, there may be hundreds of LANs at branch office sites.

Before explaining functional details of the invention in detail, reference is again made to FIG. 1 which illustrates some possible placements of a gateway/translator 200 according to embodiments of the invention (marked 200B and 200C) so that it may facilitate communication between a WAN server 110 and a plurality of endpoint devices 150 (marked 150A-150H). Endpoint devices 150 may include substantially any communication device including, but not limited to telephones (e.g. IP phones), wireless access points, computers, embedded processors, pagers and satellite location determination units. In the pictured embodiment, endpoint devices 150 include wireless access points (150A and 150B) and IP telephones (150C; 150D; 150E; 150F; 150G and 150H). Additional examples of endpoint devices (not pictured) are wireless IP phones connected via a wireless link to wireless access points (e.g. 150A and/or 150B).

In an exemplary embodiment of the invention, endpoint devices 150 are characterized by limited memory and/or processing power, and therefore employ a simple protocol such as TFTP.

For example, a TFTP Server/Client operating in VxWorks OS may require about 15 Kbytes of RAM to perform an update. An HTTP Server and Client operating in Linux OS may require 90-150 KBytes to perform a similar task. Optionally, HTTP require at least 3 times as much available Ram memory as TFTP. In many cases, this difference is reflected in R&D effort and time to develop HTTP client/server in comparison to TFTP client/server.

Deployment of a Gateway/Translator within the Network Architecture

In an exemplary embodiment of the invention, WAN server 110 resides in a LAN 170A and is connected externally through a router 120A. WAN server 110 is optionally capable of receiving requests and sending responses across an Internet 140 via WAN links 130 across Internet 140. Requests optionally originate from, and return to, other LANs (e.g. 170B and 170C). Optionally, LAN 170B includes a router 120B in addition to a gateway/translator 200B according to the present invention. In LAN 170C, gateway translator 200C according to the present invention communicates directly with WAN server 110 via a WAN link 130 and optionally performs the function of a router.

Typically, WAN links 130 between server 110 and LANs 170C and/or 170B are characterized by a long round trip delay, above 50 milliseconds, or even 200 milliseconds, In some embodiments of the invention, in order to overcome long round trip delay, a protocol which allows transmission of a plurality of packets before acknowledgments are received, is used to control the communications between server 110 and gateway 200. Optionally, the transmission protocol comprises a sliding window protocol, for example TCP/IP. TCP employs a window which allows it to send packets before receipt of acknowledgements. Although HTTP has no such window, HTTP is implemented over TCP/IP. Therefore, TCP allows HTTP applications to send a next packet before getting acknowledgements to a previous packet. As an example, a TCP default window size is up to 64 KB. Optionally, this window is to scalable to 1 GB as part of the TCP establishment session protocol.

In an exemplary embodiment of the invention, Windows 2000 allows 16K windows size rounded up to twelve 1460-byte segments over Ethernet interface. In an exemplary embodiment of the invention, Windows NT allows 8760 windows size rounded up to six 1460-byte segments over Ethernet interface.

However, network devices configured to operate in UDP are incapable of sliding window transmission. As a result, they derive no benefit from the relatively high parallelity of the TCP/IP environment in the LAN.

In an exemplary embodiment of the invention, gateway/translators 200B, 200C are provided to allow a device or group of devices 150 residing in a LAN (e.g. 170C or 170B) to access content from WAN server 110. In an exemplary embodiment of the invention, the content may be software for installation and/or upgrade. In an exemplary embodiment of the invention, access includes translation and/or conversion of requests originating from devices 150 and/or responses supplied by server 110. In an exemplary embodiment of the invention translation and/or conversion includes translation between protocols with different degrees of parallelity (e.g. TCP/IP and UDP/IP) and/or conversion of data transfer units of a first size to data transfer units of a second size. In an exemplary embodiment of the invention, the gateway also includes a local network cache so that some requests may be processed locally, without being relayed to remote server 110. Optionally, this local processing of requests by the network cache reduces a burden on available bandwidth between LANs 170B and 170C and server 110. In an exemplary embodiment of the invention, a device supports TFTP/UDP/IP in LAN environment issues a TFTP request which is intercepted and translated into a HTTP/TCP/IP request. The request elicits an HTTP response which is translated into a series of TFTP/UDP/IP data blocks and relayed to the requesting device. Optionally, this reduces the need for sending a low parallelity request across a WAN link. Optionally, this reduces the need for manual provisioning of a local server.

Gateway 200 according to some embodiments of the invention may be deployed, for example in remote branch offices of a company with headquarters housing server 110. By deploying a gateway 200 in this way, a company might distribute software updates from server 110 located at headquarters 170A to branches 170B and 170C where devices 150A-150H such as IP phones and/or wireless access points are located. Alternatively or additionally, server 110 belongs to a service provider which services a plurality of companies not associated with the company operating the branch offices. This configuration reduces the need for devices 150 to attempt communication with server 110 in an inefficient low parallelity protocol and/or reduces the need for manual provisioning of a local server in LAN 170B and/or 170C.

Throughout the text and figures, any device, server or component thereof described/depicted as a single unit may reside in two or more separate physical entities which act in concert to perform the described/depicted function. Alternatively or additionally, any device, server or component thereof described/depicted as two or more separate physical entities may be integrated into a single physical entity to perform the described/depicted function.

Gateway Overview

Figure 2:
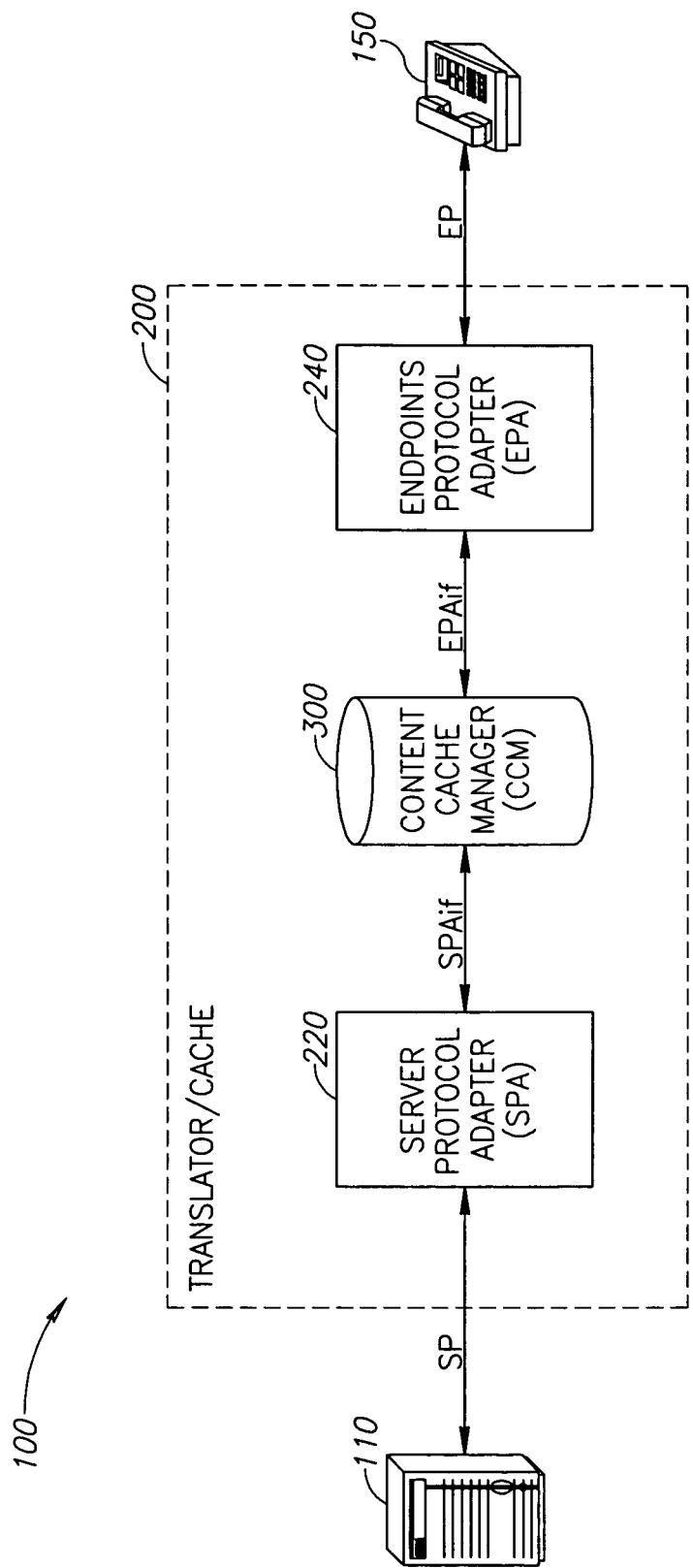
FIG. 2 schematically illustrates functional components of a gating device according to an embodiment of the present invention in greater detail.

FIG. 2 is a block diagram of Gateway 200 and its connections within network architecture 100, in accordance with an exemplary embodiment of the invention. Gateway 200 optionally comprises an Endpoints Protocol Adapter (EPA; 240), a Content Cache Manager (CCM; 300) and a Server Protocol Adapter (SPA; 220). In an exemplary embodiment of the invention, gateway 200 processes one or more of outgoing requests from devices 150A-150H and incoming responses from server 110.

Handling of Outbound Requests

In an exemplary embodiment of the invention, gateway 200 intercepts any outbound request originating from a device 150 and formatted according to a low parallelity and/or insecure protocol, such as TFTP. Optionally, gateway 200 evaluates the request and determines that it is either a "new request" or a "repeat request".

For purposes of this specification, a "new request" refers to a request for a content item/WAN server 110 combination which does not match an earlier request and/or cannot be filled with a stored or cached response from an earlier request. A content item may be, for example, a file or a portion of a file stored on server 110.

According to various exemplary embodiments of the invention, matching of requests in order to determine which requests are "new requests" and which requests are "repeat requests" may be based upon analysis of one or more of IP address of device 150, file name requested by device 150, UDP port employed by device 150 (for TFTP) and UDP port employed by gateway 200. Optionally, a new request is determined according to file name. Optionally, internal management of the file/blocks in the gateway relies upon one or more of Client IP address, Client Port and Server Port.

For purposes of this specification, a "repeat request" refers to a request for a same content item on a same WAN server 110 as designated in an earlier request.

According to various embodiments of the invention, "an earlier request" may refer to an earlier request from a different device 150, and/or a request currently being handled by gateway 200 and/or a request for which an appropriate response is currently residing in a local network cache or local network storage.

In an exemplary embodiment of the invention, new requests are concurrently stored locally by gateway 200 and relayed to WAN server 110 so that server 110 will provide the requested content item as a response. In an exemplary embodiment of the invention, repeat requests are stored by gateway 200 and matched with an appropriate response from an earlier new request. Optionally, the appropriate response is already available, for example in a network cache operated by gateway 200. Optionally, the appropriate response has not yet been received from server 110.

Handling a New Outbound Request

For purposes of illustration, a request originating from IP phone 150F in LAN 170C is described in detail. In this illustrative example, gateway 200C of LAN 170C communicates with devices 150B, 150F, 150G and 150H using TFTP and the request originates from device 150F as a TFTP request. TFTP operates in a UDP/IP environment which requires an acknowledgement for each transmitted data transfer unit. WAN server 110 will be described, for purposes of illustration as an HTTP server which operates in TCP/IP. HTTP permits concurrent transmission of, for example, 16 or more data packets in response to a single request. HTTP/TCP permits concurrent transmission of as many as 44 data packets in response to a single request prior to receipt of an acknowledgement. It is stressed that TFTP and HTTP are used as examples only and that any low parallelity and/or insecure protocol could be substituted for TFTP and any high parallelity and/or could be substituted for HTTP. In an exemplary embodiment of the invention, a secure protocol such as HTTPS is employed. Additional high parallelity protocols which could be substituted for HTTP include, but are not limited to FTP and SCP.

In the example, the request is from device 150F in the form of an IP phone. The request for a content item stored on server 110 is intercepted by gateway 200. Interception may be, for example, by endpoints protocol adapter (EPA) 240 as illustrated in FIG. 2. In an exemplary embodiment of the invention, EPA 240 relays the request to content cache manager (CCM) 300. In some embodiments of the invention, CCM 300 determines if the request matches a similar request previously handled by CCM 300. The request is for a specified content item stored on server 110. According to the example, the request is in TFTP format. In the current example, CCM 300 compares the request to other requests it is currently handling and determines that it is a new request. The request is therefore concurrently stored and relayed to server protocol adapter 220. Storage of the outbound request may be, for example, in EPA 240 or CCM 300.

SPA 220 translates the request into a suitable high parallelity protocol, HTTP (HTTPS if security is an issue) in this example. This translation may involve reorganization of the request from one or more TFTP blocks into one, or optionally more than one, HTTP packets. Optionally, the request includes an address of WAN server 110 when it originates from device 150. Alternatively, gateway 200 adds the address of WAN server 110 to the request. In an exemplary embodiment of the invention, translation of the outgoing request includes substituting a return address corresponding to device 150 with a return address corresponding to gateway 200 so that the outgoing HTTP request produces a response from server 110 addressed to gateway 200. Optionally, CCM 300 compiles a list of addresses for all devices 150 issuing requests for the same content item/server 110 pair. In an exemplary embodiment of the invention, CCM 300 employs the list compiled by CCM 300 to determine which devices 150 will receive a same response.

Handling of the HTTP request from the time it leaves SPA 220 is according to HTTP convention. In some embodiments of the invention, the HTTP request transmitted by SPA 220 is such that server 110 can not differentiate between a request that originated as a TFTP request in LAN 170 and a request originating from an HTTP device such as a PC operating a WWW browser.

In response to the request, server 110 prepares an HTTP response which may include one or more packets of information. These are sent on a return path according to the return address indicated in the request (e.g. device 150 and/or gateway 200). In an exemplary embodiment of the invention, the response is addressed to gateway 200. A separate section hereinbelow describes "Handling of incoming responses" by gateway 200.

Handling a Repeat Outbound Request

For purposes of illustration, an additional request originating from IP phone 150G in LAN 170C is described in detail. In this second example, the request from device 150G arrives at EPA 240 of gateway 200 after the request originating from device 150F has been received.

As in the above example, EPA 240 relays the request to CCM 300. In this second example, CCM 300 determines that the content item/server 110 specified in the request match those of the previous request from device 150F. CCM 300 therefore identifies the request from device 150G as a "repeat request". The exemplary repeat request of device 150G is stored by gateway 200, for example, in EPA 240 or CCM 300 but is not translated to HTTP by SPA 220 or relayed to server 110.

Each repeat request is matched with an appropriate response from an earlier new request. Depending upon the time delay between the original new request and the repeat request, the appropriate response may either already be available (e.g. in a network cache) or may not yet have been received from server 110. If the appropriate response is not yet available, gateway 200 stores the request until such time as an appropriate response is available.

Handling of Incoming Responses

Discussion of incoming responses is in the context of the two illustrative examples presented hereinabove and should not be construed as limiting the invention.

Each new request relayed to server 110 will elicit an HTTP response in the form of one or more HTTP packets. The HTTP response arrives at gateway 200 and is processed by SPA 220. In this illustrative example the response to the new request issued by device 150F is translated from HTTP to TFTP by SPA 220. SPA 220 relays the incoming response to CCM 300.

The HTTP response is generally received in packets of a size determined by the maximum transfer unit (MTU) of the network path between server 110 and gateway 200.

The MTU is set by the Layer 2 interface (e.g. Ethernet, or Serial interface as frame relay or PPP) and it not part of the TCP/IP and UDP/IP stack. This feature of the Layer 2 interface optionally compensates for the inability of the HTTP protocol to set up block size. Exemplary packet sizes commonly used in the art are 576 bytes and 1536 bytes but the present invention is not limited to any specific packet sizes. TFTP has extension/TFTP option to support other then 512 B block sizes.

The translation optionally includes division of one or more packets of the HTTP response from server 110, into blocks of a size suitable for the TFTP environment of LAN 170. In an exemplary embodiment of the invention, SPA 220 divides the response into TFTP blocks, for example blocks of 512 bytes. In an exemplary embodiment of the invention, one or more large packets are divided into a plurality of smaller blocks and each block is stored.

In an exemplary embodiment of the invention, the MSS option of TCP is employed to set a maximum segment size (MSS) as part of the establishment of a TCP connection for use used during the duration of the TCP connection. Optionally, MSS is employed to synchronize HTTP (TCP) and TFTP block sizes. This option can reduce the need for division of incoming response packets at gateway 200.

Optionally, each TFTP block is stored until acknowledgment is received that the block has been delivered to the device 150 which made the request that resulted in delivery of the HTTP packet containing the block.

In an exemplary embodiment of the invention, each block is cached even after it was delivered to the device 150 for which it was fetched from server 110, in case other devices 150 request the same or similar data. Alternatively or additionally, a block may be deleted from storage and/or cache before it has been delivered to all relevant devices 150 and be re-requested from server 110 to supply to one or more devices 150. Gateway 200 may optionally perform this deletion and re-requesting in order to temporarily provide space in a cache.

Figure 3:
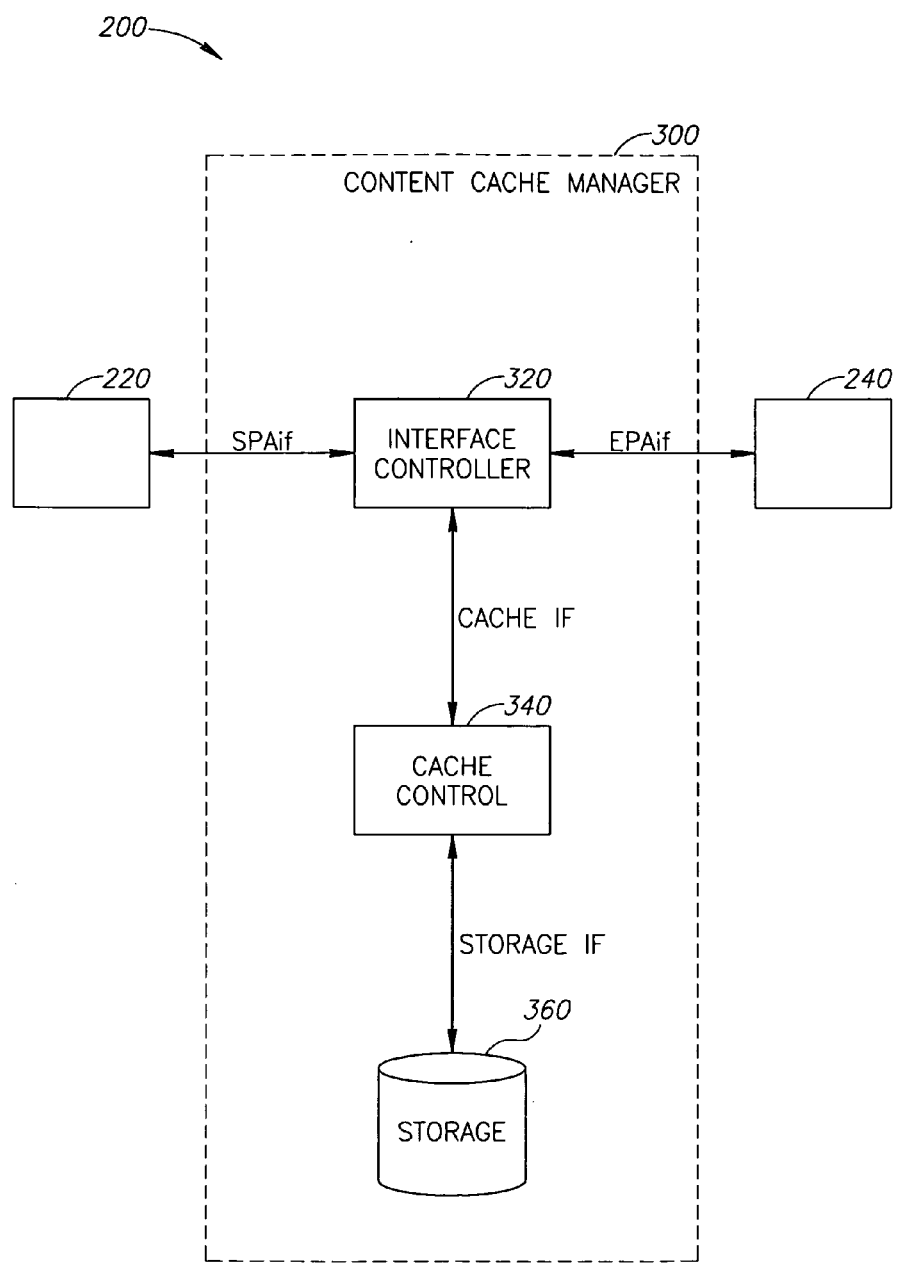
FIG. 3 schematically illustrates a caching module of a gating device according to an embodiment of the present invention in greater detail.

FIG. 3 is a schematic representation of functional components of a content cache manager (CCM) 300, in accordance with an exemplary embodiment of the invention. While the exact architecture of CCM 300 may vary, it is depicted as including an interface controller 320, a cache controller 340 and a storage 360. As indicated in FIG. 3, interface controller 320 of CCM 300 serves as a gate between server interface 220 and endpoint interface 240. In an exemplary embodiment of the invention, CCM 300 matches between outgoing TFTP requests and incoming HTTP responses. In an exemplary embodiment of the invention, CCM 300 stores requests in storage 360 until an appropriate response is identified and relayed to device 150. Optionally, CCM 300 matches requests and responses using data pertaining to server 110 and/or a requested content item.

In an exemplary embodiment of the invention, CCM 300 matches requests and responses by identifying a server/content item combination. For example, a new request relayed to server 110 may specify a destination address of 255.244.164.0 and a content item of Communicall V2.7.1.ZIP. CCM 300 optionally logs and stores series of subsequent requests with a similar address and content item designation. When a response indicating 255.244.164.0 as the sending device and Communicall V2.7.1.ZIP as the file name is received, CCM 300 matches this response to the request originally relayed to server 110 and all members of the series of subsequent requests with a similar address and content item designation.

In an exemplary embodiment of the invention, the file name is found on first read/write TFTP packet. The track on file transfer may be done based on the session information such as destination/source and/or ip address and/or source/destination UDP/TCP port in order to identify the session on which the file is transferred. Thus, CCM 300 and adaptors may keep status information of file name and destination/source ip address and source/destination UDP/TCP ports in order to know which file is transferred and on which session. According to various exemplary embodiments of the invention, gateway 200 may match responses to requests by analyzing one or more of IP address of server 110, TCP port of server 110, TCP port of gateway 200.

Initiating Concurrent Requests

In an exemplary embodiment of the invention, a group of devices 150 are induced to make a similar request concurrently. The request may be, for example, a request for a software installation/upgrade download.

In some embodiments of the invention, a central server issues a command to all devices of type X to request software version Y. The server may be, for example, a controller located in the same LAN as the devices of type X. In an exemplary embodiment of the invention, gateway 200 issues the command. In an exemplary embodiment of the invention, the controller issues the command to all devices of type X concurrently, optionally simultaneously. In an exemplary embodiment of the invention, the controller issues the command to devices of type X in sequential groups, with all devices in each group receiving the command concurrently, optionally simultaneously. In an exemplary embodiment of the invention, the controller issues the command to each device of type X sequentially. Sequential issue of a command to multiple devices may be with random and/or defined intervals between commands. Optionally, sequential issue of commands prevents an overload on gateway 200 by preventing multiple similar requests from devices 150 being received simultaneously. Optionally, gateway 200 handles simultaneous requests for a single content item and designates only one of the simultaneous requests as a new request.

In some embodiments of the invention, each device 150 makes a request for upgrade. Optionally, devices 150 are programmed to check for available software upgrades during start up. This "check during start-up" feature permits a system administrator to initiate a software upgrade by, for example, turning off all of devices 150 and turning them back on. Optionally, power to devices 150 is provided from a central location, such as a computerized controller, a common electric circuit or a single electric junction box. Providing power to devices 150 from a central location facilitates coordinated shut down and restart by shutting off the power and turning it back on.

Coordinated shut down and restart may be achieved electronically (if a computerized controller controls the circuits) or manually (if the circuits are controlled by one or more switches in a junction box).

In an exemplary embodiment of the invention, coordinated restart causes all of devices 150 to begin a start up routine within a short interval of time, for example within 30 seconds.

In an exemplary embodiment of the invention, devices 150 are IP phones which, as part of their startup routine, load a current software version, perform a DHCP/UDP process to get an IP address and then begin a TFTP process to check with WAN server 110 whether there is a need to update software. As a result, the number of checks for software updates corresponds to the number of devices 150 on the circuit.

In an exemplary embodiment of the invention, the controller may receive a prompt which causes the controller to urge devices 150 to request a software update. For example, server 110 may send a message to the controller including the information:

"Communicall V2.7.1. now available; replace earlier versions"

The controller responds by sending the following commands to devices 150;

"Check if Communicall software installed; if no, take no action, if yes check version number;

If version number is less than 2.7.1, shutdown and restart."

In an exemplary embodiment of the invention, a local server in LAN 170 instructs the device 150 to reset and check whether there is new firmware on server 110.

Although only four devices 150 are pictured in each of LANS 170, the invention will work with any number of devices 150. Some typical networks include hundreds or even thousands of devices. In an exemplary embodiment of the invention, as the number of similar devices 150 increases, the percentage of requests for software upgrade relayed outside the LAN to server 110 decreases. Optionally, processing requests without relaying them to a remote server increases available Internet bandwidth for other functions and/or reduces dependence on manual provisioning and/or providing/managing local TFTP servers.

In an exemplary embodiment of the invention, gateway 200 reduces the average time required for each of devices 150 to complete a software upgrade. Gateway 200 may optionally achieve this reduction in time by causing requests received in a low parallelity protocol to be handled in a high parallelity protocol over most of their path. Alternatively or additionally, gateway 200 achieves this reduction by implementation of a network cache as described in greater detail hereinbelow. In an exemplary embodiment of the invention, gateway 200 reduces the need for manual provisioning of a local server by facilitating efficient direct communication between devices 150 and remote server 110.

In an exemplary embodiment of the invention, gateway 200 is concerned only with requests and responses and does not attempt to ascertain what devices 150 do with a response after it has been provided to them. Optionally, initiation of concurrent requests is performed for devices 150 which are similar, but not necessarily identical, and issue identical requests. In some cases, an identical installation is performed on all devices 150 issuing the identical requests. In other cases slight differences dictated by variations in hardware configuration of devices 150 cause individual devices to perform slightly different upgrades or installations. These differences in hardware configuration may result, for example, from installation of devices of different models from a single manufacturer in a single LAN 170.

In an exemplary embodiment of the invention, gateway 200 is installed in a LAN including a group of devices 150 with different versions of software installed (e.g. versions 1.0; 1.01; 1.1; 1.2 and 1.21). In an exemplary embodiment of the invention, all conform to a single version (e.g. version 2.5) after upgrade. Again gateway 200 is concerned only with requests and responses and does not attempt to ascertain what devices 150 do with a response after it has been provided to them so that each device 150 may be sequentially upgraded through a series of intervening versions until the most recent version (e.g. version 2.5) is achieved. In an exemplary embodiment of the invention, LAN 170A represents a corporate headquarters and LANS 170B and 170C represent corporate branch offices.

Implementation of a Network Cache

In general, a network cache is implemented to reduce the need for communication outside the LAN. When managing a network cache the total available storage space in the cache must be balanced against the storage requirements imposed on the cache by various tasks it must perform. Different cache management algorithms have been implemented in the past for various types of tasks.

In an exemplary embodiment of the invention, the cache is designed and configured to handle a large number of similar requests received from similar devices 150 in a short period of time. Optionally, the cache concurrently stores other items related to other tasks. As explained above, only one of the large number of similar requests is defined as a "new" request and relayed to server 110. The remaining requests are defined as repeat requests and handled within the LAN by gateway 200.

For purposes of illustration, it is convenient to discuss CCM 300 in terms of three functions; interface controller 320, cache control 340 and storage 360. While these functional modules are depicted as physically separate entities in FIG. 3 for clarity, they may reside together in a single physical entity in practice.

Interface controller 320 serves as a bridge between EPA 240 and SPA 220. Traffic across the bridge is optionally bidirectional.

With respect to traffic originating in the LAN 170, interface controller 320 optionally evaluates outbound requests in a LAN format (e.g. TFTP) and determines if each request is a "new" or a "repeat" request as defined hereinabove. Interface controller 320 will route both "new" and "repeat" requests to storage 360 (optionally through cache control 340) but only new requests will be relayed by interface controller 320 to SPA 220 for translation to a WAN format, such as HTTP.

With respect to traffic originating outside the LAN, interface controller 320 optionally receives responses from server 110 and routes them to cache control 340. Optionally, the responses are translated from a WAN format (e.g. HTTP) to a LAN format (e.g. TFTP) by SPA 220 before they arrive at Interface controller 320. In the context of the illustrative examples set forth above, responses will be divided into a plurality of TFTP blocks, each block having a sequential number out of a total number and a designation corresponding to the "new" request which was relayed to server 110.

Each response is relayed to storage 360, optionally through cache control 340. Optionally, an incoming HTTP packet of a response is translated into data blocks as described hereinabove. The blocks may be transferred to storage 360 sequentially, or in groups.

Cache control 340 matches stored requests with stored responses and sends relevant data blocks to devices 150 in order to fill requests. In an exemplary embodiment of the invention, cache control 340 manages storage 360 so that a large number of requests may be handled using a small amount of storage space in storage 360.

Cache control 340 must consider the total capacity of storage 360 and manage the stored requests and blocks of response so that the capacity of storage 360 is not exceeded. In order to effectively manage storage 360, cache control 340 may implement one or more known caching algorithms. Known caching algorithms include, but are not limited to head caching, just in time retrieval, least recently used (LRU) and most frequently used (MFU). Because the capacity of storage 360 is finite, cache control 340 may need to delete some items from storage 360, even if those items may be required again in the future. The requirement to delete may become more stringent when the number of concurrent different tasks increases and/or when the number of requests being handled concurrently increases.

In an exemplary embodiment of the invention, cache control 340 allocates a specified volume of memory to a specific content item. The specified volume may optionally be smaller than the size of the content item. Optionally, limiting the volume of memory allocated to a specific content item causes a supplementary request to be issued for an additional portion of the content item once a previous portion has been deleted from storage 360. In an exemplary embodiment of the invention, the specified volume is defined as a relative amount of a size of the content item and/or a relative amount of the capacity of storage 360. Optionally, storage 360 may be dedicated in its entirety to a single content item.

Interval Caching

In an exemplary embodiment of the invention, cache control 340 manages storage 360 using an interval caching algorithm. In interval caching, cache control 360 determines which blocks belonging to a particular response are currently being transferred to at least one device 150. The blocks of a single response are sequentially ordered, and each response contains a finite number of blocks. According to interval caching, when a large number of similar requests are being concurrently filled from a single cached response, those blocks between the lowest number block and the highest number block currently being relayed to devices 150 determine an access interval. Optionally, two or more access intervals are defined for a single cached response. The access interval may be defined as a number of blocks. Blocks in the access interval receive the highest priority to remain in the cache. Because the size of the access interval constitutes a demand on available space in the storage 360, it is desirable to decrease the size of the access interval. One way to reduce the access interval is to temporally coordinate performance of a similar task by a number of devices 150 as described above in "Initiating concurrent requests". However, the degree of coordination achieved by temporal coordination of initiation may be insufficient in some cases.

Reducing the Access Interval

Reduction in the size of the access interval can make additional space available in storage 360 by reducing the number of data blocks which must be concurrently stored. This reduction may be important, for example, when storage 360 is nearly full and/or when storage space for data in an access interval of a current response is greater than a predetermined value.

In order to reduce the access interval, the flow of data to different devices 150 concurrently receiving a single response may be dynamically regulated. Dynamic regulation of flow may be achieved, for example, by differential allocation of LAN bandwidth among a plurality of devices 150.

In an exemplary embodiment of the invention, cache control 340 differentially allocates bandwidth by introducing short pauses in data transmission to specific devices 150. Pauses may be introduced, for example, between data blocks. By way of illustration, in TFTP, an acknowledgement is sent from each device 150 to EPA 240 at the end of each data block. In an exemplary embodiment of the invention, cache control 340 compares the block number of each TFTP acknowledgement to the block number currently being transmitted to other devices 150. Devices 150 which are receiving a comparatively high block number become candidates for reduced bandwidth allocation, for example in the form of a brief pause before delivery of the next data block begins. This reduced allocation of bandwidth causes those devices which are closest to completing receipt of a specific response from WAN server 110 to wait so that other devices 150 can catch up. The access interval becomes narrower as a result of the imposed pauses.

However, if pauses in data transmission are too long, device 150 may perceive the response as being aborted and repeat the request. Repeat requests for the same content item by a single device would increase, not decrease, the access interval. Therefore, cache control 340 chooses a pause length shorter than a timeout period for the specific LAN communication protocol employed. As a result, the specific LAN communication protocol employed limits the degree to which dynamic flow control can be implemented.

In an exemplary embodiment of the invention, gateway 200, optionally cache control 340, introduces pauses which serve the goal of reducing the access interval. Optionally, pauses are 12 seconds or less, optionally 10 seconds or less, optionally 4 seconds or less, optionally 1 second, optionally hundreds of milliseconds, optionally tens of milliseconds, optionally 1 millisecond or less. In an exemplary embodiment of the invention, cache control imposes a plurality of pauses on a single device 150, each pause after a successive data block. Optionally, pauses are sufficiently long that device 150 retransmits its acknowledgement 1 or more times. In an exemplary embodiment of the invention, cache control 340 counts acknowledgements for a specific packet from a specific device and transmits a next block of data only after a specific number of acknowledgements have been received. Optionally, the number of acknowledgements is determined by the specific protocol employed. Optionally, in a protocol in which n acknowledgements are sent before a repeat request is issued, cache control 340 counts (n−1), optionally n, acknowledgements before sending the next data block.

Potential Advantages of Access Interval Reduction

In order to highlight the potential advantages of reducing the access interval, an illustrative example in which numerous devices 150 each request a software upgrade in a coordinated manner is presented. The software upgrade has a size of 2 MB and will be divided by SPA 220 into 4096 data blocks of 512 octets each for distribution in a TFTP LAN 170. There are several ways in which this request may be handled.

In a first scenario, storage 360 has at least 2 megabytes of available space. According to this first scenario it is possible to retrieve the entire 2 megabytes, divide the content into data blocks for TFTP distribution, and cache all of the blocks. In this case, implementation of dynamic flow control interval caching permits cache control 340 to delete the first data block from storage 360 relatively soon and delete subsequent data blocks periodically after that. Deletion of blocks by cache control 340 frees a portion of storage 360 for other tasks. Alternatively or additionally, because each data block is deleted after all requesting devices 150 have received it; SPA 220 translates and relays only 1 request to server 110 in order for all the devices 150 to receive the requested software upgrade. As a result, gateway 200 rapidly becomes available for other tasks and/or resources of storage 360 become available for other uses.

In a second scenario, storage 360 has less than 2 megabytes of available space. According to this second scenario it is possible to retrieve a portion of the 2 megabytes, divide the retrieved portion of the content into data blocks for TFTP distribution, and cache the blocks. In this case, implementation of dynamic flow control interval caching permits cache control 340 to delete the first data block from storage 360 relatively soon and delete subsequent data blocks periodically after that. Deletion of blocks by cache control 340 frees a portion of storage 360. Some relevant high parallelity protocols, such as HTTP, permit interruption of a request, for example when no free space in storage 360 remains, and resumption of download from a specified point at a later time. Cache control 340 takes advantage of this "interrupt/resume" feature of HTTP and issues a supplementary request for at least part of the un-retrieved content. In this way, gateway 200 and/or cache control 340 shift a storage burden for content to server 110 without interfering with efficiency of transmission of the content to device 150.

Considerations in Cache Management

Figure 4A:
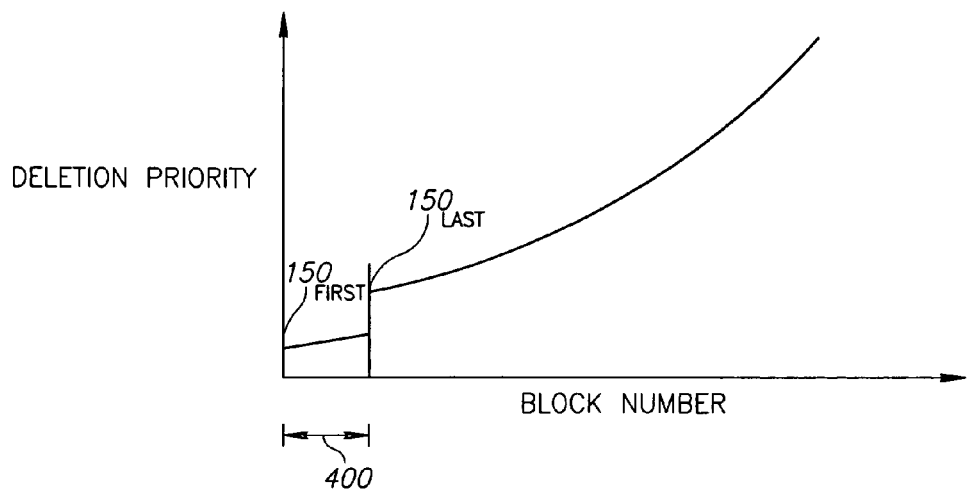
FIGS. 4A and 4B illustrate access intervals near the beginning of a coordinated software upgrade and at a later stage of the process according to an embodiment of the present invention.
Figure 4B:
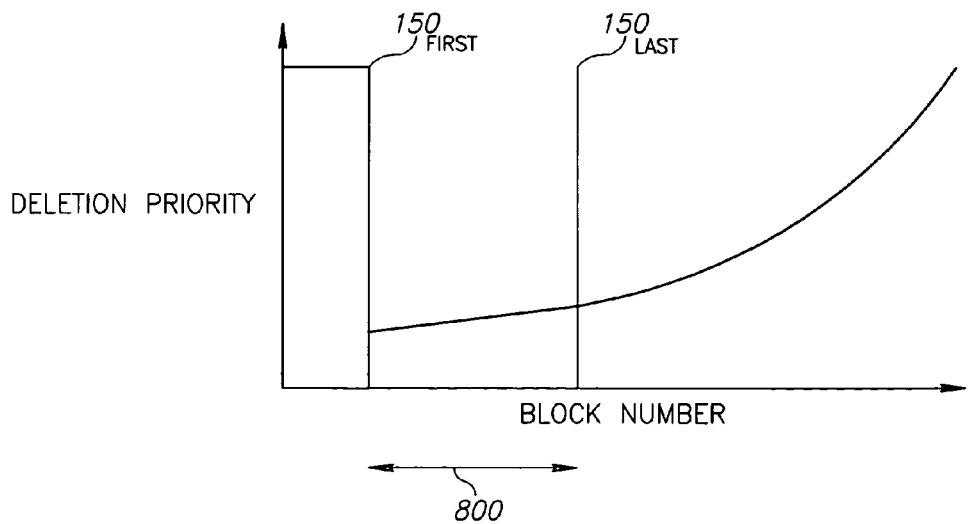

FIGS. 4A and 4B illustrate assignment of deletion priorities to blocks of data in storage 360. Cache controller 340 attempts to select a block for removal from storage 360 in a way that will allow SPA 220 to operate freely and to avoid selecting a block that will shortly be sent to one of devices 150. In order to accomplish this, cache controller 340 assigns a "deletion priority" to block stored in storage 360 (FIGS. 4A and 4B). Cache controller 340 preferentially deletes blocks with a higher priority in order to free storage space in storage 360. Cache controller 340 reviews and adjusts deletion priority of blocks during operation.

Cache control 340 may consider, for example, the following factors for each block in determining a deletion priority: sequential block number within the content resource or file, residency time in storage 360 and the number of devices 150 currently downloading the block. In TFTP, a device 150 which has acknowledged receipt of a previous block might be considered to be downloading a next block.

When deleting blocks from a content resource which is currently being handled by EPA 240 cache control 340 optionally employs an "interval-caching" block replacement strategy. According to the interval-caching strategy, data blocks in an access interval (400 in FIG. 4A and 800 in FIG. 4B) are assigned a low deletion priority. Access interval 400 includes the set of blocks of a given file that lies between the block being downloaded by a device that is closest to completing the download ($150_{last}$), and the device that is furthest from completing the download ($150_{first}$). Optionally a default access-interval 400 is kept at the beginning of a download to permit additional devices 150 to join the download and benefit from blocks cached in storage 360 (FIG. 4A). The default access-interval 400 may be defined in number of blocks or by a time increment. Optionally, the default access interval is eliminated after a period of time in which no additional devices 150 have initiated download has elapsed. While the default access-interval 400 is maintained, cache control 340 may optionally delete blocks with a high deletion priority, such as those with high block numbers. Optionally, deletion priority for blocks within access interval 400 may vary. In an exemplary embodiment of the invention, the access interval corresponds to a number of blocks transferred in 10 to 30 seconds, optionally 15 to 25 seconds. In an exemplary embodiment of the invention, the access interval corresponds to a number of blocks transferred in about 20 seconds. Alternatively or additionally, the access interval may vary with the number of devices 150. Optionally, a greater number of devices will produce a greater access interval.

Blocks which have already been received by $150_{first}$ receive a high deletion priority because they are unlikely to be the subject of future requests from devices 150. Optionally, those blocks in this category which have a greater residence time in storage 360 are assigned a higher priority (FIG. 4B). In contrast to a least recently used algorithm, a block which has been distributed to all of devices 150 receives a high deletion priority essentially immediately after it has been provided to device $150_{first}$. In a least recently used algorithm, the deletion priority of the same block would increase slowly after the block had been distributed to $150_{first}$. In an exemplary embodiment of the invention, cache control 340 deletes blocks which have been delivered to all relevant devices 150 before beginning to delete blocks which have not been delivered to any device. Optionally, this deletion strategy reduces a need for communication with remote server 110.

In an exemplary embodiment of the invention, cache control 340 evaluates blocks for which no requests from EPA 240 have yet been received by calculating how close they are to $150_{last}$. Optionally, blocks which are closer to $150_{last}$ receive a lower deletion priority because EPA 240 will be requesting them sooner for transmission to one of devices 150 than blocks which are further away from $150_{last}$. Depending upon the constraints upon storage 360, it may be desirable to discard blocks which are far away from $150_{last}$ and retrieve them again in the future. Optionally, a "just in time" algorithm which considers, for example, the rate of progress of $150_{last}$ and the amount of time anticipated for receipt of a response from server 110 and/or the amount of time anticipated for translation of the HTTP packet(s) into TFTP blocks is employed in conjunction with interval caching.

Figure 5:
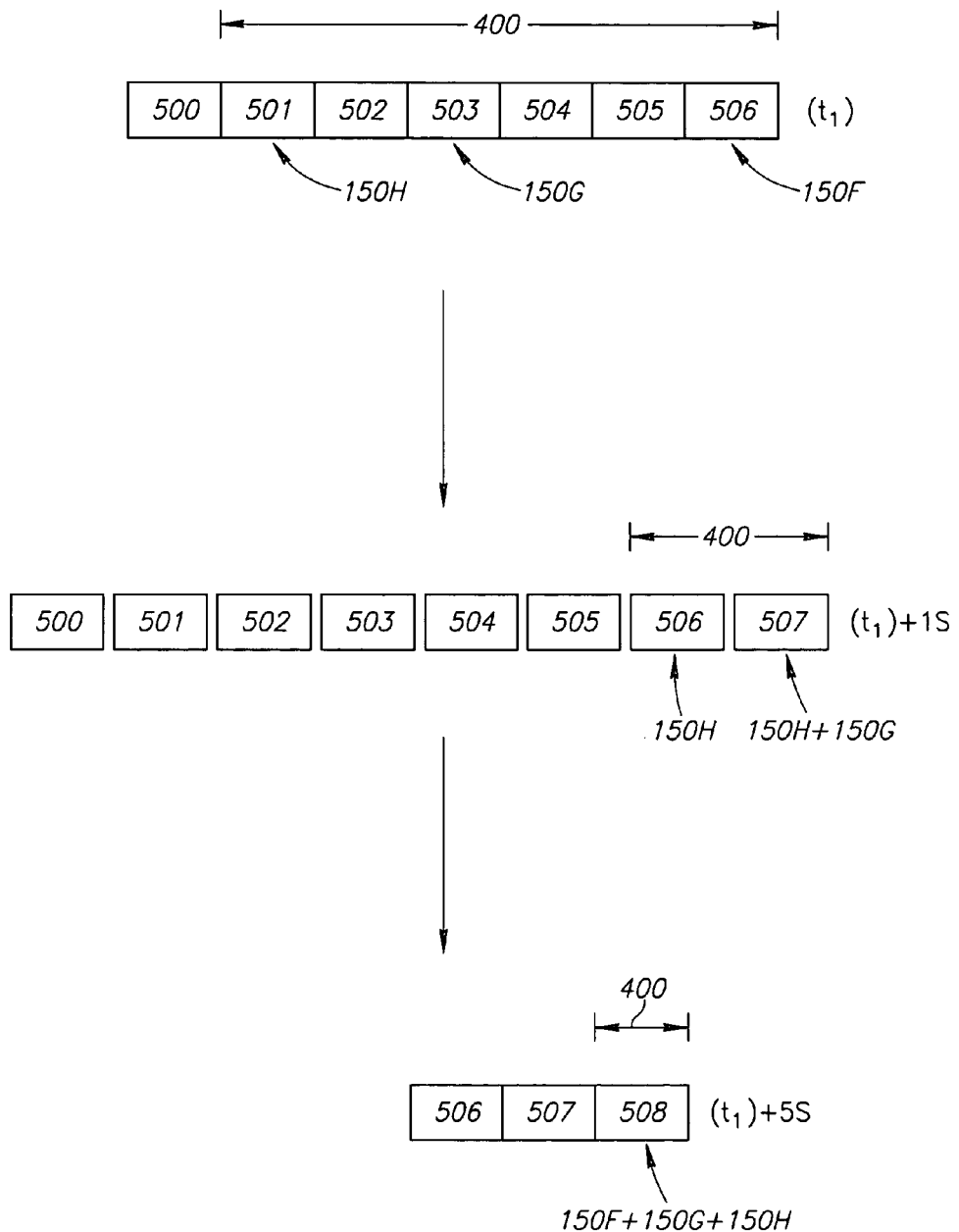
FIG. 5 is a diagram illustrating how dynamic flow control according to some embodiments of the invention reduces an access interval.

As indicated above, cache control 340 optionally reduces the access-interval during the course of a download by implementation of dynamic flow control. FIG. 5 is a simplified pictorial representation of how dynamic flow control helps free storage space in storage 360. FIG. 5 illustrates a subset of blocks of data in a content resource numbered sequentially from 500. An example with three devices 150 is presented for clarity, although in practice the number of devices may be much larger. Conceivably, nearly any number of devices 150 might be served by storage 360 and cache controller 340, optionally operating in the context of gateway 200 as described hereinabove. At an arbitrary time point $t_1$, devices 150F, 150G and 150H of LAN 170C are accessing data blocks 501, 503 and 506 respectively. In the context of examples described above, each data block is a TFTP data block of 512 octets. Assuming a low bandwidth for each device 150 of 4 Kb/s, each of devices 150 will take 1 second to receive one of data blocks 501-508. At time $t_1$, each of devices 150 is proceeding at a similar rate, without differential allocation of bandwidth to produce dynamic flow control. As shown, this results in an access interval 400 with a width of 6 data blocks.

Assuming that cache control 340 employs access interval cache management at $t_1$, block 500 would have a very high deletion priority, blocks 507 and higher would have an intermediate deletion priority and blocks 501-506 (within access interval 400) would have a low deletion priority. This means that cache control 340 would attempt to allocate space in storage 360 corresponding to at least 6 data blocks to maintain only the access interval blocks.

At time $t_1+1$ s, cache control 340 implements differential allocation of bandwidth to produce dynamic flow control according to the present invention. When device 150F sends a TFTP acknowledgment signal to EPA 240 indicating receipt of block 506, cache control 340 imposes a wait of 5 seconds before beginning transmission of block 507 to device 150F. Concurrently, when device 150G sends a TFTP acknowledgment signal to EPA 240 indicating receipt of block 503, cache control 340 imposes a wait of 2 seconds before beginning transmission of block 504 to device 150G. Blocks 505 and 506 are then transmitted immediately to device 150G upon receipt of TFTP acknowledgements for the preceding blocks. Concurrently, device 150H sends TFTP acknowledgment signals to EPA 240 indicating receipt of block 501-505, and is immediately answered by cache control 340 with transmission of the next data block. As a result, at time $t_1+5$ s, devices 150F and 150G are receiving block 507 and device 150H is receiving block 506. Access interval 400 has been reduced to a width of two data blocks.

When devices 150F and 150G send acknowledgements for receipt of block 507 to EPA 240, cache control 340 imposes a one second wait on these devices. Concurrently, device 150H receives block 506, acknowledges receipt to EPA 240, receives block 507 and acknowledges receipt to EPA 240. Again, cache control 340 does not impose any wait on device 150H. As a result, at time $t_1+6$ s, all of devices 150F, 150G and 150H begin receiving block 508 from storage 360. Access interval 400 has been reduced to one block (508).

The above example has been provided for clarity of illustration only. Actual data transfer rates may be much higher, for example, 64 kbps or more.

Alternatively or additionally, if access interval 400 becomes too large, devices 150 may be split into two or more groups, each group being defined by a separate access interval and subject to dynamic flow interval caching as described hereinabove. Optionally, the interval between groups may be reduced using the principles of dynamic flow control as detailed hereinabove. Criteria for defining groups may vary, for example with size of storage 360, number of devices 150, the specific low parallelity and/or insecure protocol employed, initial access interval 400, the specific low parallelity and/or insecure protocol employed and available bandwidth outside the LAN. In an exemplary embodiment of the invention, cache control 340 divides devices 150 into groups if a continuous sequence of 10, optionally 20, optionally 50, optionally 100 or more blocks which are not currently being sent to any device 150 is detected.

The present invention relies upon execution of various commands and analysis and translation of various data inputs. Any of these commands, analyses or translations may be accomplished by software, hardware or firmware according to various embodiments of the invention. In an exemplary embodiment of the invention, machine readable media contain instructions for translation of a low parallelity and/or insecure protocol request to a high parallelity and/or secure protocol request, and/or translation of a high parallelity and/or secure protocol response to a LAN response and/or implementation of dynamic flow control of data blocks stored in a cache. In an exemplary embodiment of the invention, a CPU executes instructions for translation of a low parallelity and/or insecure protocol request to a high parallelity and/or secure protocol request, and/or translation of a high parallelity and/or secure protocol response to a LAN response and/or implementation of dynamic flow control of data blocks stored in a cache.

The present invention has been described using detailed descriptions of embodiments thereof that are provided by way of example and are not intended to necessarily limit the scope of the invention. In particular, numerical values may be higher or lower than ranges of numbers set forth above and still be within the scope of the invention. Alternatively or additionally, portions of the invention described/depicted as a single unit may reside in two or more separate physical entities which act in concert to perform the described/depicted function. Alternatively or additionally, portions of the invention described/depicted as two or more separate physical entities may be integrated into a single physical entity to perform the described/depicted function. The described embodiments comprise different features, not all of which are required in all embodiments of the invention. Some embodiments of the invention utilize only some of the features or possible combinations of the features. Variations of embodiments of the present invention that are described and embodiments of the present invention comprising different combinations of features noted in the described embodiments can be combined in all possible combinations including, but not limited to, use of features described in the context of one embodiment in the context of any other embodiment. The scope of the invention is limited only by the following claims.

In the description and claims of the present application, each of the verbs "comprise", "include" and "have" as well as any conjugates thereof, are used to indicate that the object or objects of the verb are not necessarily a complete listing of members, components, elements or parts of the subject or subjects of the verb.

The invention claimed is:

1. A method comprising: transmitting a request from a first network element to a second network element;
   receiving, at the first network element from the second network element, a response to the request, wherein the response is in a first protocol;
   translating the response in the first protocol to a second protocol, wherein translating the response comprises partitioning at least one packet of the response into a plurality of data blocks;
   transmitting from the first network element, using the second protocol, the plurality of data blocks to:
   i. a first telecommunications terminal, wherein the plurality of data blocks are transmitted to the first telecommunications terminal at a rate of R1;
   ii. a second telecommunications terminal, wherein the plurality of data blocks are transmitted to the second telecommunications terminal at a rate of R2;
   and allocating bandwidth by reducing the rate R1 so that each data block in the plurality of data blocks are transmitted to the first telecommunications terminal at the rate R2;
   wherein the plurality of data blocks are:
   i. sequentially transmitted from the first network element to the first telecommunications terminal, and
   ii. sequentially transmitted from the first network element to the second telecommunications terminal based, at least in part, on a block number associated with each data block of the plurality of data blocks.

2. The method of claim 1 wherein allocating bandwidth is based, at least in part, on comparing the block number of a first data block to the block number of a second data block in which the first data block is transmitted to the first telecommunications terminal and the second data block is transmitted to the second telecommunications terminal; and
   wherein if the block number of the first data block is greater than the block number of the second data block, the first network element allocates bandwidth by reducing the rate R1 so that each data block in the plurality of data blocks are transmitted to the first telecommunications terminal at the rate R2.

3. The method of claim 1 wherein the first network element allocates bandwidth by reducing the rate R1 so that each data block in the plurality of data blocks are transmitted to the first telecommunications terminal at the rate R2 based, at least in part, on the second protocol.

4. The method of claim 1 wherein the first protocol supports concurrent transmission of as many as forty-four data transfer units.

5. The method of claim 1 wherein the second protocol supports concurrent transmission of only one data transfer unit.

6. The method of claim 1 wherein receiving the response at the first network element from the second network element comprises caching at least a portion of the response in a cache.

7. The method of claim 1 wherein translating the response in the first protocol to the second protocol comprises translating the response from an SCP/TCP/IP protocol to a TFTP/UDP/IP protocol.

8. The method of claim 1 wherein translating the response in the first protocol to the second protocol comprises translating the response from an H-I-I-PS/TCP/IP protocol to a TFTP/UDP/IP protocol.

9. The method of claim 1 wherein translating the response in the first protocol to the second protocol comprises translating the response from an FTP/TCP/IP protocol to a TFTP/UDP/IP protocol.

10. The method of claim 1 wherein translating the response in the first protocol to the second protocol comprises translating the response from an H-I-I-P/TCP/IP protocol to a TFTP/UDP/IP protocol.

11. The method of claim 1 wherein translating the response in the first protocol to the second protocol comprises translating the response from an SFTP/TCP/IP protocol to a TFTP/UDP/IP protocol.

* * * * *